(12) United States Patent
Jin et al.

(10) Patent No.: US 10,719,961 B2
(45) Date of Patent: Jul. 21, 2020

(54) SYSTEMS AND METHODS FOR IMPROVED PET IMAGING

(71) Applicant: General Electric Company, Schenectady, NY (US)

(72) Inventors: Xiao Jin, San Ramon, CA (US); Xue Rui, Niskayuna, NY (US); Jiahua Fan, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 156 days.

(21) Appl. No.: 16/043,991

(22) Filed: Jul. 24, 2018

(65) Prior Publication Data

US 2019/0340793 A1 Nov. 7, 2019

Related U.S. Application Data

(60) Provisional application No. 62/667,060, filed on May 4, 2018.

(51) Int. Cl.
*G06T 11/00* (2006.01)
*G06K 9/62* (2006.01)
*G06T 7/00* (2017.01)

(52) U.S. Cl.
CPC .......... *G06T 11/005* (2013.01); *G06K 9/6256* (2013.01); *G06K 9/6268* (2013.01); *G06T 7/0014* (2013.01); *G06T 2207/10081* (2013.01); *G06T 2207/10104* (2013.01); *G06T 2207/20081* (2013.01); *G06T 2207/30016* (2013.01)

(58) Field of Classification Search
None
See application file for complete search history.

(56) References Cited

U.S. PATENT DOCUMENTS

| | | | |
|---|---|---|---|
| 2017/0061629 A1* | 3/2017 | Zhu | G06T 5/007 |
| 2018/0144214 A1* | 5/2018 | Hsieh | G06K 9/6265 |
| 2018/0197317 A1* | 7/2018 | Cheng | G06N 3/08 |
| 2019/0030370 A1* | 1/2019 | Hibbard | G16H 30/40 |
| 2019/0080456 A1* | 3/2019 | Song | G06N 3/00 |
| 2019/0130569 A1* | 5/2019 | Liu | G06T 11/008 |
| 2019/0220977 A1* | 7/2019 | Zhou | G06N 3/084 |
| 2019/0259159 A1* | 8/2019 | Udupa | A61B 6/032 |

OTHER PUBLICATIONS

Gong, "Iterative PET Image Reconstruction Using Convolutional Neural Network Representation" arXiv:1710.03344v1 [cs.CV] Oct. 9, 2017, 8 pages.

Liu, "NucleiNet: A Convolutional Encoder-decoder Network for Bio-image Denoising", 2017 IEEE, pp. 1986-1989, 4 pages.

Wang, "Low Dose PET Reconstruction with Total Variation Regularization", 2014 IEEE, pp. 1917-1920, 4 pages.

Xu, "200x Low-dose PET Reconstruction using Deep Learning" arXiv:1712.04119v1 [cs.CV] Dec. 12, 2017, 9 pages.

(Continued)

*Primary Examiner* — Mazda Sabouri
(74) *Attorney, Agent, or Firm* — The Small Patent Law Group LLC; Dean D. Small

(57) ABSTRACT

A method is provided that includes acquiring initial PET imaging data. The method also includes acquiring CT imaging data. Further, the method includes training a deep learning model for PET image reconstruction using the initial PET imaging data and the CT imaging data.

17 Claims, 7 Drawing Sheets

(56) References Cited

OTHER PUBLICATIONS

Yang, "Low-dose x-ray tomography through a deep convolutional neural network", www.nature.com/scientificreports, Published Feb. 7, 2018, 8:2575, DOI:10.1038/s41598-018-019426-7, 13 pages.
Yu "Noise Type Evaluation in Positron Emission Tomography Images" 2016 1st International Conference on Biomedical Engineering (IBIOMED), Yogyakarta, Indonesia, 6 pages.

* cited by examiner

SYSTEMS AND METHODS FOR IMPROVED PET IMAGING

RELATED APPLICATIONS

This application claims priority to U.S. Provisional Application Ser. No. 62/667,060, entitled "Systems and Methods for Improved PET Imaging," filed May 4, 2018, the entire subject matter of which is hereby incorporated by reference.

BACKGROUND OF THE INVENTION

The subject matter disclosed herein relates generally to apparatus and methods for diagnostic medical imaging, such as positron emission tomography (PET) imaging.

BRIEF DESCRIPTION OF THE INVENTION

In various embodiments, methods and/or systems provide for training and/or using deep learning models for reconstructing PET images using acquired initial PET imaging data and acquired CT imaging data. For example, the model may include a sequence of convolutional blocks, with each block using the initial PET imaging data as an input along with at least one additional input (e.g., the CT imaging data for the first block, or the output of the preceding block for subsequent blocks).

In one example embodiment, a method is provided that includes acquiring initial PET imaging data. The method also includes acquiring CT imaging data. Further, the method includes training a deep learning model for PET image reconstruction using the initial PET imaging data and the CT imaging data.

In another example embodiment, a system is provided that includes a PET acquisition unit, a CT acquisition unit, and processing unit. The PET acquisition unit is configured to acquire initial PET imaging data. The CT acquisition unit is configured to acquire CT imaging data. The processing unit is configured to acquire the initial PET imaging data and the CT imaging data from the PET acquisition unit and CT acquisition unit, respectively, and to reconstruct an image using a deep learning model, with the initial PET imaging data and the CT imaging data used as inputs to the deep learning model.

In another example embodiment, a method is provided that includes acquiring initial PET imaging data with a PET acquisition unit, and acquiring CT imaging data with a CT acquisition unit. The method also includes reconstructing an image using a deep learning model, wherein the initial PET imaging data and the CT imaging data are used as inputs to the deep learning model.

DETAILED DESCRIPTION OF THE INVENTION

Figure 1:
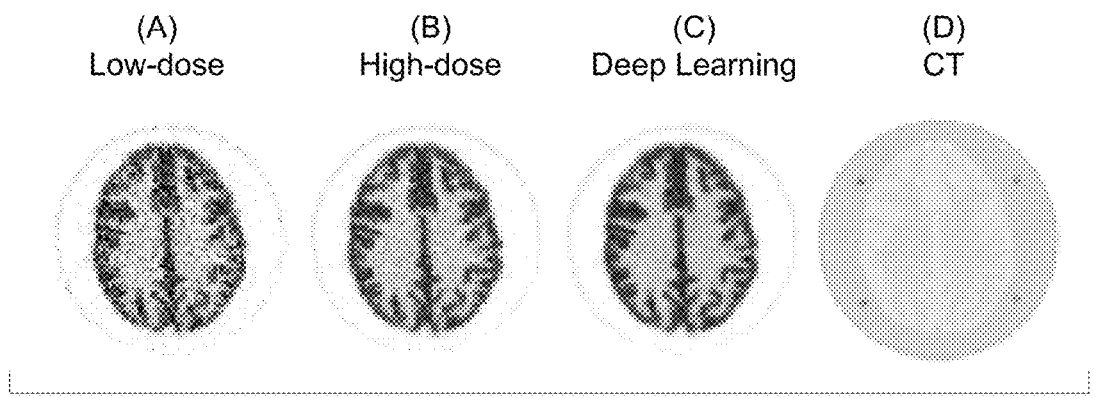
FIG. 1 provides comparison views of a brain phantom study.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. For example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" of are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide systems and methods for improving image quality. For example, reduction of noise provided by various embodiments provides one or more of higher image quality, more accurate diagnostic accuracy, radiation dose reduction, shorter clinical scanning duration, or scanner cost saving.

Various embodiments provide for the training and use of deep learning models for generating images using imaging information from multiple modalities. For example, PET imaging data may be used in conjunction with imaging data from one or more other imaging modalities, such as computed tomography (CT) imaging data.

In various embodiments, a series of convolutional blocks are used to train a deep learning model for image reconstruction, with each convolutional block using an initially acquired data set from a first imaging modality (e.g., a PET data set) as an input. For example, an initially acquired PET data set may be a first input and an initially acquired data set from a second imaging modality (e.g., CT data set) may be a second input for the first convolutional block, with an intermediate output as an output from the first convolutional block. A second convolutional block may use the initially acquired PET data set with the intermediate output from the first convolutional block as inputs, and provide a second output. Optionally, additional convolutional blocks may be employed, with each additional block using the initially acquired PET data set as an input, and also using the output from the immediately preceding convolutional block as an input.

Various embodiments utilize CT information in training and use of deep learning to reduce PET image noise. Various embodiments improve PET image quality and enhance diagnostic accuracy of PET/CT studies by reducing the noise in reconstructed images through deep learning. For example, a deep-learning model utilizing convolutional neural networks (CNN) is trained and used by various embodiments to leverage information from both CT and PET images to reduce the noise in PET images.

In an illustrative example, a deep learning model includes two sequential blocks of CNN, with each block containing four convolutional layers with ReLU activation functions. The inputs to the first CNN block are low-dose PET image patches and CT image patches of 17×17 pixels. The inputs to the second CNN block are a predicted PET image patch of 9×9 pixels that is output from the first CNN block, along with the low-dose PET image patches that were also input to the first CNN block. The targets for training are high-dose PET images (e.g., images acquired using 4 times the dosage used to acquire the low-dose image patches). Within each block, the first three convolutional layers contain 64 filters of 3×3 pixels, and the fourth or last layer contains one 3×3 filter. In the illustrative example, the neural network was trained and evaluated using clinical and phantom studies.

The results of the illustrative example indicated, for example, that the structural information in the CT images can aid the definition of the contour of features in a PET image, and substantially reduce the noise in a low-dose PET image. The trained neural network can better recover fine features relative to both evaluated low-dose and high-dose PET images. In example clinical studies, the neural network's prediction of the signal to noise ratio of a studied lung lesion was 250% higher than that of the low-dose PET images. The results indicate that the neural network can correctly recover the PET activity despite the strength of the CT signal. The results demonstrated that the structural information in the CT images can substantially enhance the feature contour definition and noise reduction in PET images.

Figure 2:
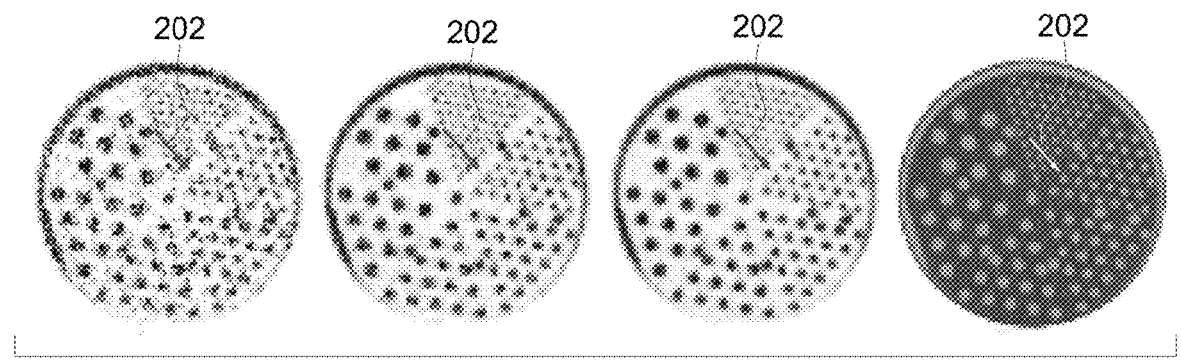
FIG. 2 provides comparison views of a rod-structured phantom study.
Figure 3:
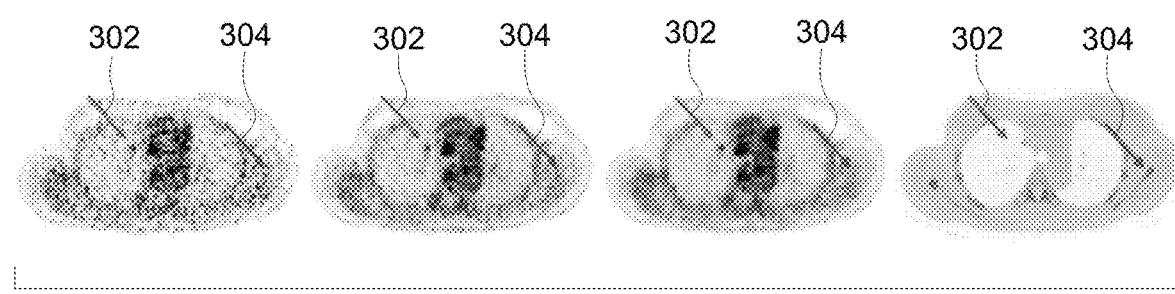
FIG. 3 provides comparison views of a clinical study.
Figure 4:
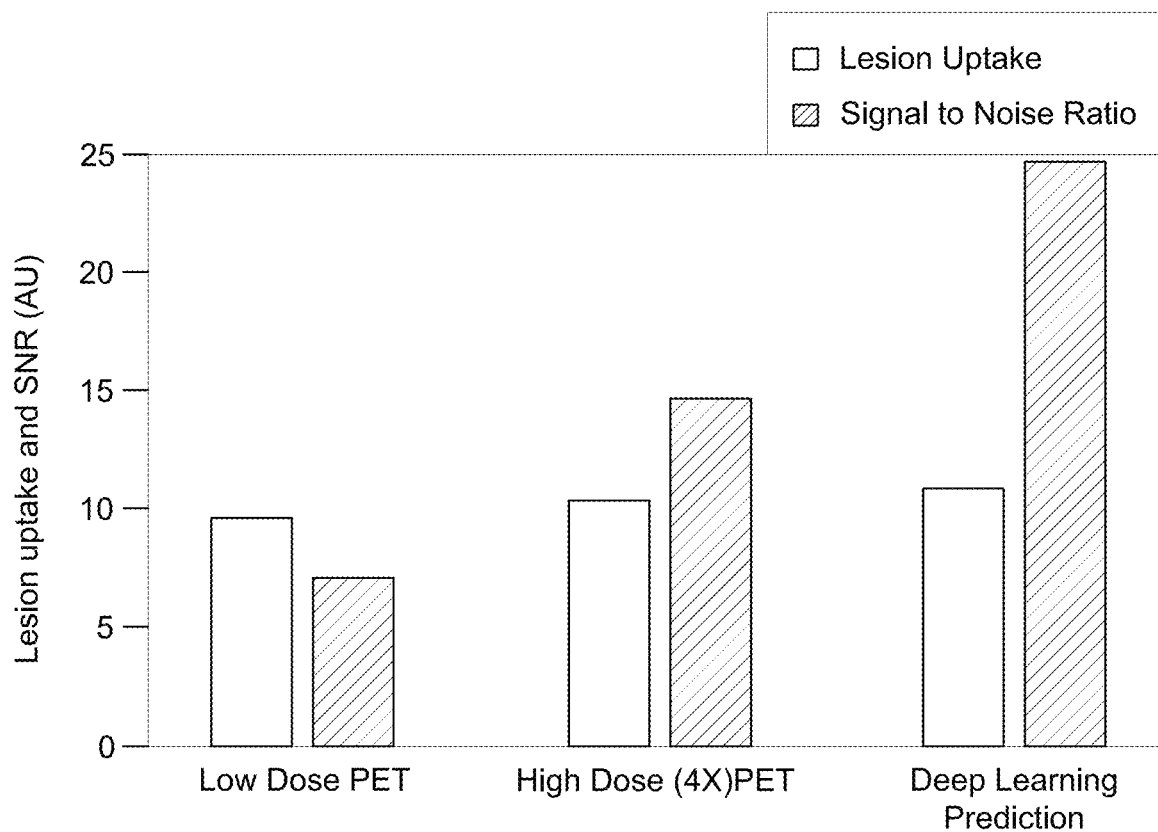
FIG. 4 provides a graph showing signal to noise ratios.

FIGS. 1 through 4 depict comparative results of the illustrative example. FIG. 1 depicts results from a Hoffman brain phantom study, FIG. 2 depicts results from a Derenzo phantom study, FIG. 3 depicts results from a $^{18}$F-FDG clinical study, and FIG. 4 depicts signal to noise ratios of lung lesions in a clinical study. The figures in each column of FIGS. 1-3 show the comparison of (A) low-dose PET images, (B) high-dose (4X) PET images, (C) predicted PET images from the neural network using the low-dose PET images as inputs, and (D) the corresponding CT images. The CT images were pre-processed to enhance the edge contrast and to remove regions with non-PET activity. The PET images predicted by the neural network show substantial reduction of noise and improved delineation of the feature contours, as pointed by the arrows 202 in FIG. 2. As shown in FIG. 3, the neural network can correctly recover the PET activity even when the CT signal is non-correspondingly weak (arrows 302) or strong (arrows 304). Quantitatively, FIG. 4 shows that the neural network's prediction of the signal to noise ratio of the lung lesion in FIG. 3 was 250% higher than that from the low-dose PET, whereas the absolute lesion uptake was comparable among the three cases, indicating that the neural network can reliably recover the lesion uptake and substantially reduce image noise.

Figure 5:
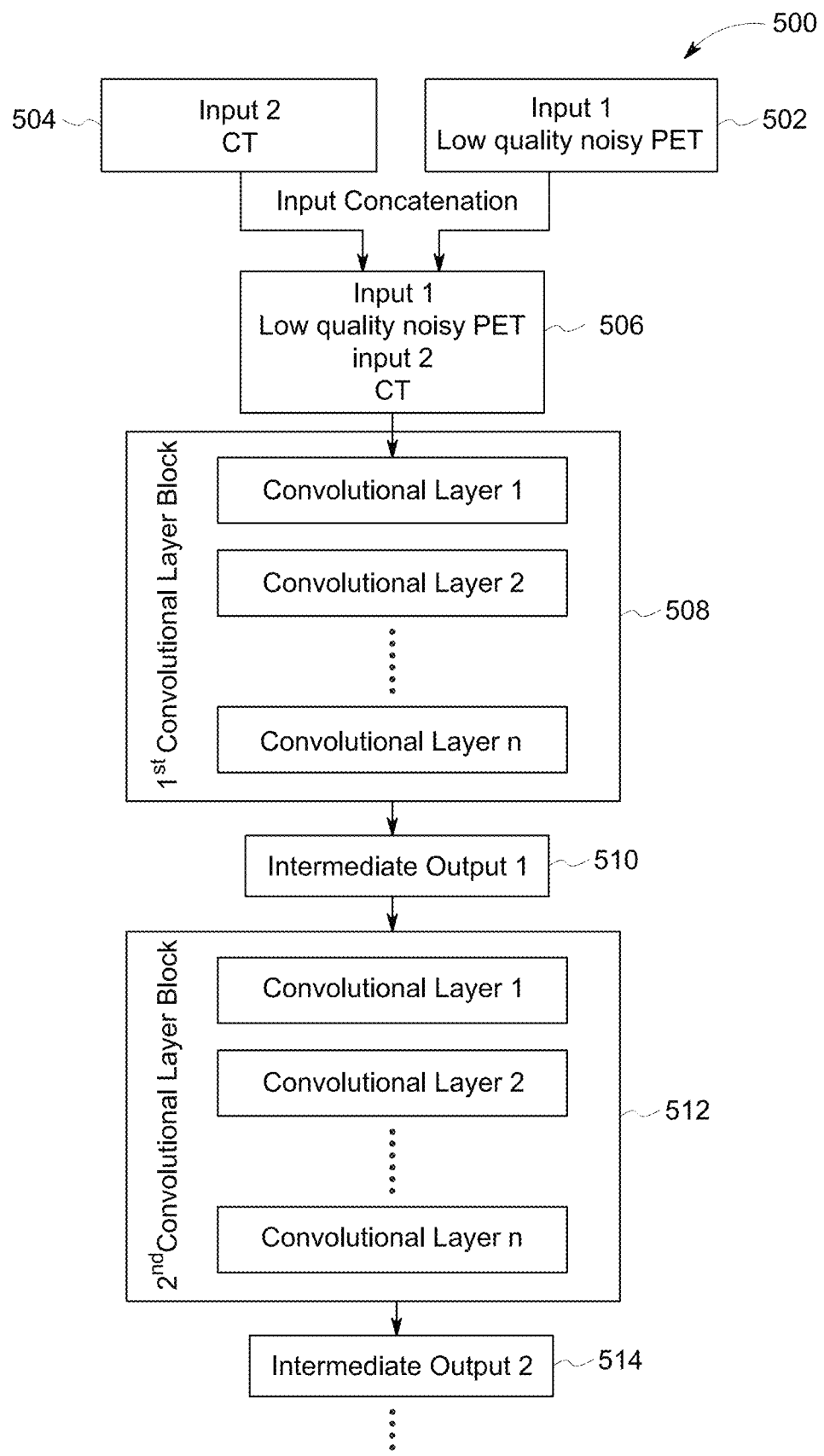
FIG. 5 depicts a process flow of training or using a deep learning model in accordance with various embodiments.

FIG. 5 provides a schematic view of a process flow 500 for training (and/or using) a neural network. Aspects of the process flow may be utilized in connection with training a neural network for use in reconstructing PET images, or in connection with reconstructing PET images using such a neural network. It may be noted that while the process flow 500 shows two convolutional blocks, more blocks may be added to the sequence as indicated by the ellipses at the bottom of FIG. 5. Accordingly, the output of the second block may be understood as a final output in embodiments using a sequence having only two blocks, or as an intermediate output in embodiments using a sequence having more than two blocks.

As seen in FIG. 5, a first step 502 includes inputting initial PET data. In the illustrated embodiment, the initial PET data is acquired at a relatively low dose, or is low quality noisy PET data. At 504 CT data is input. The PET data and CT data may be acquired with a multi-modality PET/CT imaging system. The PET data may be acquired via detection of gamma photons, and the CT data may be acquired via detection of X-ray photons. Next, input concatenation is performed to combine the initial PET data with the CT data at 506. It may be noted that the CT information may be pre-processed before combining with the initial PET data. For example, CT information and PET data are generally acquired at different energy levels. For improved compatibility with the PET data, the CT data may be pre-processed to transform the CT data to a PET-equivalent set of CT data to represent how the CT data would appear if the CT data were acquired using gamma photons similar to those used in the PET acquisition.

At 508, the CT data and the initial PET data are processed using a first convolutional layer block. The first convolutional layer block includes convolutional layers 1, 2, ... n. For example, in the illustrative example, four layers were used in the first convolutional block. The first convolutional layer block produces a first intermediate output 510. Generally, the CT data may be used as a guide to improve image quality provided by the PET data. It may be noted that various portions of an imaged volume may be visible in CT imaging but not in PET imaging. For example, a metal implant may be visible in a CT image but not a PET image. However, if the CT image is used as a guide for modifying the PET image, the metal implant may appear in the modified PET image. To address such artifacts, a modified PET image (e.g., an intermediate output 510 provided by the first convolutional layer block) may be analyzed in connection with the initial PET data.

In the illustrated example, at 512, the first intermediate output and the initial PET data are processed using a second convolutional layer block (e.g., to address any unwanted portions from the CT data that may appear in the intermediate output 510). The second convolutional layer block includes convolutional layers 1, 2, . . . n. For example, in the illustrative example, four layers were used in the second convolutional block. The second convolutional layer block produces a second intermediate output 514. As discussed above, the second intermediate output 514 may be used in a third convolutional block (not shown) that used the second intermediate output 514 and the initial PET data as inputs and produces a third intermediate output (not shown). Further, additional convolutional blocks may be added to the sequence in various embodiments. In some embodiments, the sequence may be limited to two convolutional layer blocks, with the second intermediate output 514 being used as a final output.

Figure 6:
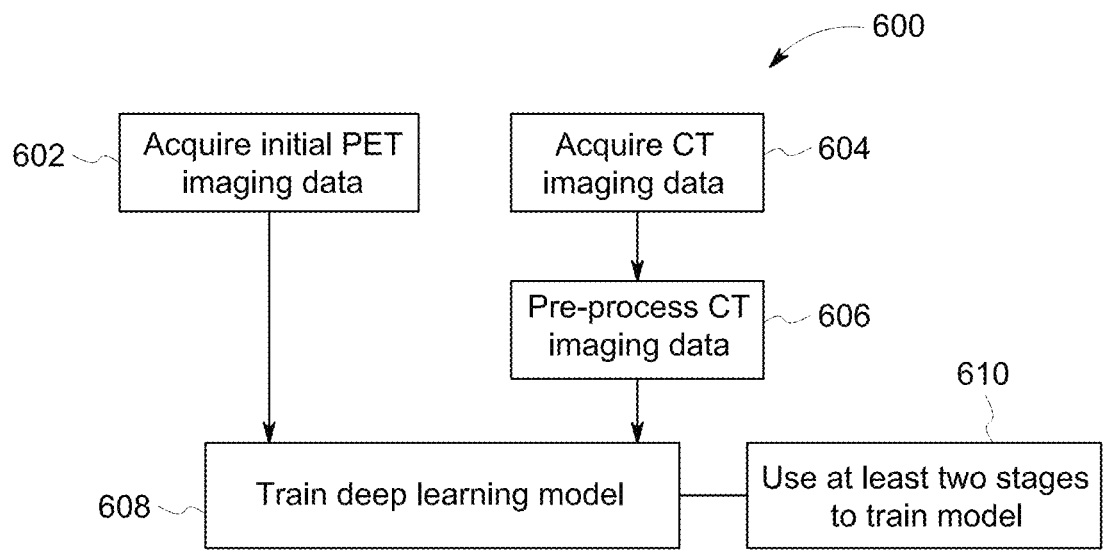
FIG. 6 depicts a flowchart of a method in accordance with various embodiments.

FIG. 6 provides a flowchart of a method 600. The method 600 (or aspects thereof), for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 600 may be used as one or more algorithms to direct hardware (e.g., one or more aspects of the processing unit 706) to perform one or more operations described herein. Generally, the method 600 is used to train a deep learning model that is to be used for reconstructing PET images. The same number of blocks or steps used to train the model may be used to subsequently reconstruct images using the model.

At 602, initial PET imaging data is acquired. For example, the PET imaging data may be relatively noisy. At 604, CT imaging data is acquired. For purposes of training the model, a large number of PET imaging data sets along with corresponding CT imaging data sets may be acquired. Further, corresponding low noise PET images or other targets may be acquired to help train the model. The data sets may be acquired as part of a clinical study and/or using available historic data sets.

It may be noted that the CT imaging data may be at a different energy level than the PET imaging data (e.g., CT imaging data at energy levels corresponding to acquired X-ray photons, and PET imaging data at energy levels corresponding to acquired gamma photons. In the illustrated embodiment, at 606, the CT imaging data may be pre-processed to be in a form more compatible with or equivalent to the PET imaging data.

At 608, a deep-learning model is trained using the initial PET imaging data and the CT imaging data. In the illustrated embodiment, at 610, at least two stages are used to train the deep learning model. For example, a first stage uses the initial PET imaging data and the CT imaging data as inputs and provides modified PET imaging data as an output, and the second stage uses the initial PET imaging data and the modified PET imaging data as inputs and provides further modified PET imaging data as an output. For example, the model may include a sequence of two or more convolutional blocks as discussed in connection with FIG. 5. The first block may use the initial PET imaging data and the CT data to produce a first output. Each subsequent block may use the initial PET imaging data and the output from the preceding block to generate an output.

Figure 7:
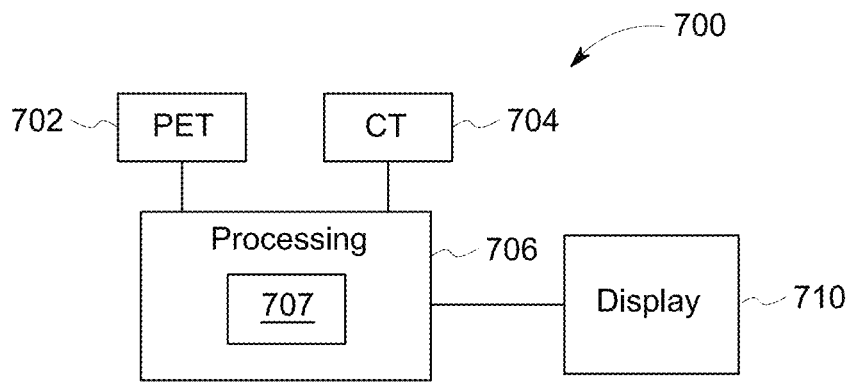
FIG. 7 provides a schematic block view of a detector assembly in accordance with various embodiments.

FIG. 7 provides a schematic block view of an imaging system 700. The imaging system 700 includes a PET acquisition unit 702 (e.g., including one or more PET detectors) and a CT acquisition unit 704 (e.g., including one or more CT detectors). The PET acquisition unit 702 and CT acquisition unit 704 may be part of a multi-modality imaging system. The PET acquisition unit 702 and CT acquisition unit 704 are operably coupled to a processing unit 706.

The processing unit 706 acquires initial PET data from the PET acquisition unit 702, and CT data from the CT acquisition unit 704. For example, the PET acquisition unit 702 and the CT acquisition unit 704 may be used to acquire imaging information from a region of interest of a patient to be imaged. The processing unit 706 uses the initial PET data and the CT data as inputs to a model (e.g., a deep learning model that has been trained as discussed herein) to reconstruct an image. For example, the data acquired by the imaging system 700 may be processed by the processing unit 706 using a series of convolution blocks. (See e.g., FIG. 5 and related discussion.) In some embodiments, the deep learning model uses at least two stages to process the imaging information. For example, a first stage may use the initial PET imaging data and the CT imaging data as inputs and provide modified PET imaging data as an output, and the second stage may use the initial PET imaging data and the modified PET imaging data as inputs and provide further modified PET imaging data as an output.

For example, the CT data and initial PET data may be used as inputs to a first block to produce a first output (e.g., modified PET data). The CT data may be pre-processed to be PET equivalent as discussed herein. The first output and the initial PET data may then be input to a second block to produce a second output (e.g., further modified PET data). Various embodiments may use additional blocks in the sequence, with each block using the initial PET data along with the output from the preceding block as inputs. The output of the final block of the sequence in various embodiments is a reconstructed PET image. The reconstructed PET image may then be displayed with display unit 710, which may display the image with a screen, or, as another example, as a printed image.

In various embodiments the processing unit 706 includes processing circuitry configured to perform one or more tasks, functions, or steps discussed herein. It may be noted that "processing unit" as used herein is not intended to necessarily be limited to a single processor or computer. For example, the processing unit 706 may include multiple processors, ASIC's and/or computers, which may be integrated in a common housing or unit, or which may be distributed among various units or housings. It may be noted that operations performed by the processing unit 706 (e.g., operations corresponding to process flows or methods discussed herein, or aspects thereof) may be sufficiently complex that the operations may not be performed by a human being within a reasonable time period. In the illustrated embodiment, the processing unit 706 includes a memory 707 that stores a set of instructions to direct the processing unit 706 to perform one or more aspects of the methods, steps, or processes discussed herein.

Figure 8:
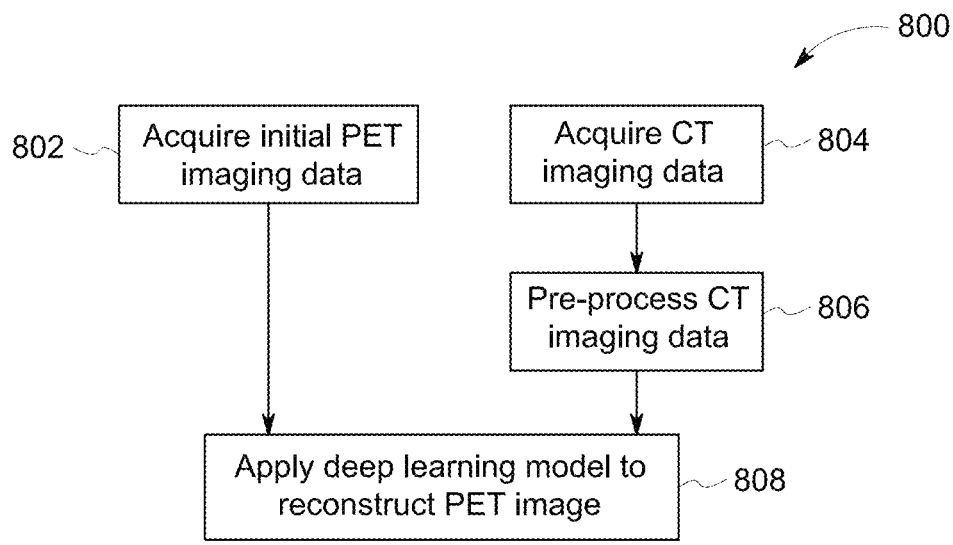
FIG. 8 provides a flowchart of a method in accordance with various embodiments.

FIG. 8 provides a flowchart of a method 800. The method 800 (or aspects thereof), for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. It may be noted that the method 800 may utilize one or more aspects of the process flow 500 and/or utilize a deep learning model trained or formed using one or more aspects of the method 600. In various embodiments, portions, aspects, and/or variations of the method 800 (and/or process flow 500) may be used as one or more algorithms to direct hardware (e.g., one or more aspects of the processing unit 706) to perform one or more operations described herein. Generally, the method 600 is used to generate a reconstructed PET image using a model generated using deep learning. The same number of blocks or steps that have been used to train the model may be used to reconstruct the image using the model. In some embodiments, a first block uses initially acquired PET data along with CT data to generate a first output. A second block uses the first output along the initially acquired PET data to generate a second output, which may be a final PET image (e.g., an image used for diagnostic purposes). For example, as discussed herein, the output of the first block may include artifacts from the CT image, and the second block may eliminate or reduce the artifacts.

At 802, initial PET imaging data is acquired (e.g, with PET acquisition unit 702). At 804, CT imaging data is acquired (e.g., with CT acquisition unit 704). The initial PET imaging data and CT imaging data may be acquired for a particular region of interest for a patient to be imaged using the corresponding acquisition units. The CT imaging data may be acquired at a different energy level or in a different format than the PET imaging data. For example, in the illustrated embodiment, the CT imaging data is acquired at energy levels corresponding to X-ray photons, while the PET imaging data is acquired at energy levels corresponding to gamma photons. In the illustrated embodiment, at 806, the CT imaging data is pre-processed to be in a form more compatible with or equivalent to the PET imaging data. For example, the CT imaging data may be converted to PET equivalent CT imaging data that represents how the CT imaging data would appear if the CT imaging data were acquiring using PET gamma photons.

At 808, a PET image is reconstructed by applying a deep-learning trained model using the initial PET imaging data and CT imaging data (e.g., a deep-learning trained model as discussed in connection with process flow 500 and/or method 600). For example, the model may include a sequence of two or more convolutional blocks. The first block may use the initial PET imaging data and the CT data to produce a first output. Each subsequent block may use the initial PET imaging data and the output from the preceding block to generate an output. After the entire sequence has been used, the reconstructed image may be displayed or otherwise provided to a practitioner for use in providing a diagnosis.

Figure 9:
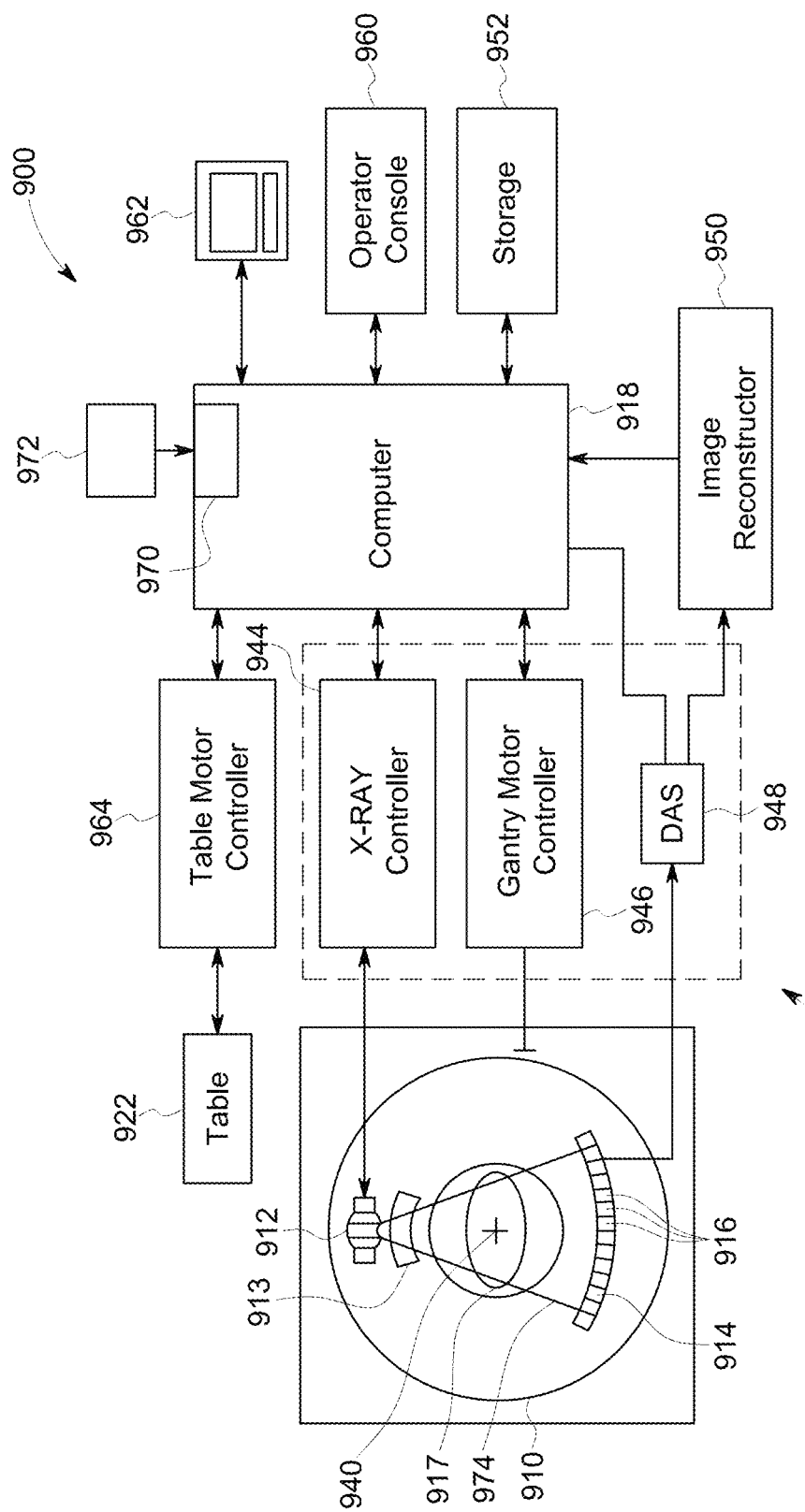
FIG. 9 provides a schematic block diagram of a CT system in accordance with various embodiments.

As discussed herein, various embodiments utilize a CT acquisition unit for acquiring CT information. FIG. 9 is a block schematic diagram of an exemplary CT imaging system 900 that may be utilized to implement various embodiments discussed herein. Although the CT imaging system 900 is illustrated as a standalone imaging system, it should be noted that the CT imaging system 900 may form part of a multi-modality imaging system in some embodiments. For example, the multi-modality imaging system may include the CT imaging system 900 and a positron emission tomography (PET) imaging system. It should also be understood that other imaging systems capable of performing the functions described herein are contemplated as being used.

The CT imaging system 900 includes a gantry 910 that has the X-ray source 912 that projects a beam of X-rays toward the detector array 914 on the opposite side of the gantry 910. A source collimator 913 and a bowtie filter module (not shown in FIG. 9) are provided proximate the X-ray source 912. In various embodiments, the source collimator 913 may be configured to provide wide collimation as discussed herein. The detector array 914 includes a plurality of detector elements 916 that are arranged in rows and channels that together sense the projected X-rays that pass through a subject 917. The imaging system 900 also includes a computer 918 that receives the projection data from the detector array 914 and processes the projection data to reconstruct an image of the subject 917. The computer 918, for example, may include one or more aspects of the processing unit 706, or be operably coupled to one or more aspects of the processing unit 706. In operation, operator supplied commands and parameters are used by the computer 918 to provide control signals and information to reposition a motorized table 922. More specifically, the motorized table 922 is utilized to move the subject 917 into and out of the gantry 910. Particularly, the table 922 moves at least a portion of the subject 917 through a gantry opening (not shown) that extends through the gantry 910. Further, the table 922 may be used to move the subject 917 vertically within the bore of the gantry 910.

The depicted detector array 914 includes a plurality of detector elements 916. Each detector element 916 produces an electrical signal, or output, that represents the intensity of an impinging X-ray beam and hence allows estimation of the attenuation of the beam as it passes through the subject 917. During a scan to acquire the X-ray projection data, the gantry 910 and the components mounted thereon rotate about a center of rotation 940. FIG. 8 shows only a single row of detector elements 916 (i.e., a detector row). However, the multislice detector array 914 includes a plurality of parallel detector rows of detector elements 916 such that projection data corresponding to a plurality of slices can be acquired simultaneously during a scan.

Rotation of the gantry 910 and the operation of the X-ray source 912 are governed by a control mechanism 942. The control mechanism 942 includes an X-ray controller 944 that provides power and timing signals to the X-ray source 912 and a gantry motor controller 946 that controls the rotational speed and position of the gantry 910. A data acquisition system (DAS) 948 in the control mechanism 942 samples analog data from detector elements 916 and converts the data to digital signals for subsequent processing. An image reconstructor 950 receives the sampled and digitized X-ray data from the DAS 948 and performs high-speed image reconstruction. The reconstructed images are input to the computer 918 that stores the image in a storage device 952. The computer 918 may also receive commands and scanning parameters from an operator via a console 960 that has a keyboard. An associated visual display unit 962 allows the operator to observe the reconstructed image and other data from computer. It may be noted that one or more of the computer 918, controllers, or the like may be incorporated as part of a processing unit such as the processing unit 706 discussed herein.

The operator supplied commands and parameters are used by the computer 918 to provide control signals and information to the DAS 948, the X-ray controller 944 and the gantry motor controller 946. In addition, the computer 918 operates a table motor controller 964 that controls the motorized table 922 to position the subject 917 in the gantry 910. Particularly, the table 922 moves at least a portion of the subject 917 through the gantry opening.

In various embodiments, the computer 918 includes a device 970, for example, a CD-ROM drive, DVD drive, magnetic optical disk (MOD) device, or any other digital device including a network connecting device such as an Ethernet device for reading instructions and/or data from a tangible non-transitory computer-readable medium 972, that excludes signals, such as a CD-ROM, a DVD or another digital source such as a network or the Internet, as well as yet to be developed digital means. In another embodiment, the computer 918 executes instructions stored in firmware (not shown). The computer 918 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

In the exemplary embodiment, the X-ray source 912 and the detector array 914 are rotated with the gantry 910 within the imaging plane and around the subject 917 to be imaged such that the angle at which an X-ray beam 974 intersects the subject 917 constantly changes. A group of X-ray attenuation measurements, i.e., projection data, from the detector array 914 at one gantry angle is referred to as a "view" or "projection." A "scan" of the subject 917 comprises a set of views made at different gantry angles, or view angles, during one or more revolutions of the X-ray source 912 and the detector array 914. In a CT scan, the projection data is processed to reconstruct an image that corresponds to a three-dimensional volume taken of the subject 917. It may be noted that, in some embodiments, an image may be reconstructed using less than a full revolution of data. For example, with a multi-source system, substantially less than a full rotation may be utilized. Thus, in some embodiments, a scan (or slab) corresponding to a 360 degree view may be obtained using less than a complete revolution.

Figure 10:
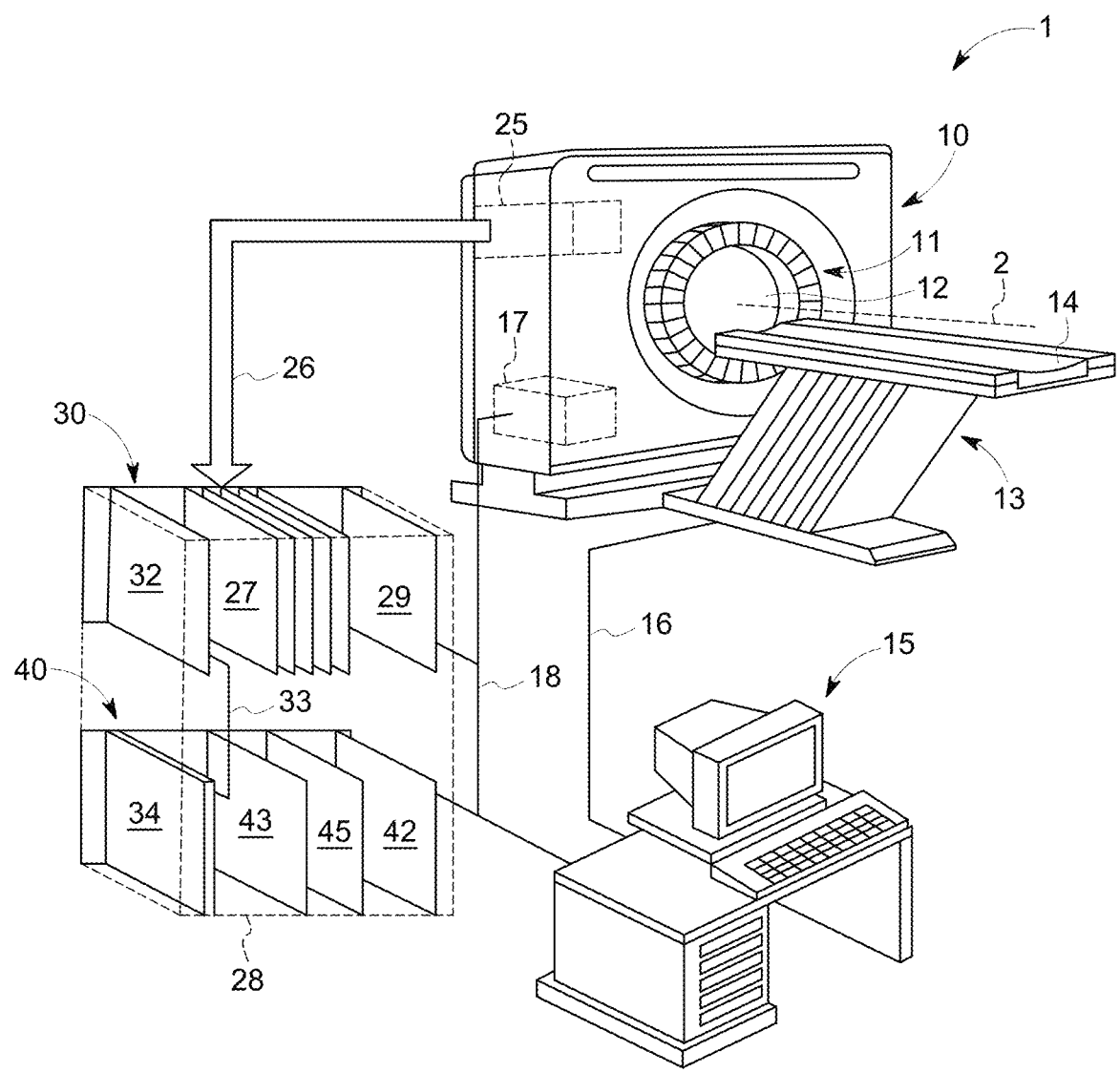
FIG. 10 illustrates a PET imaging system in accordance with various embodiments.
Figure 11:
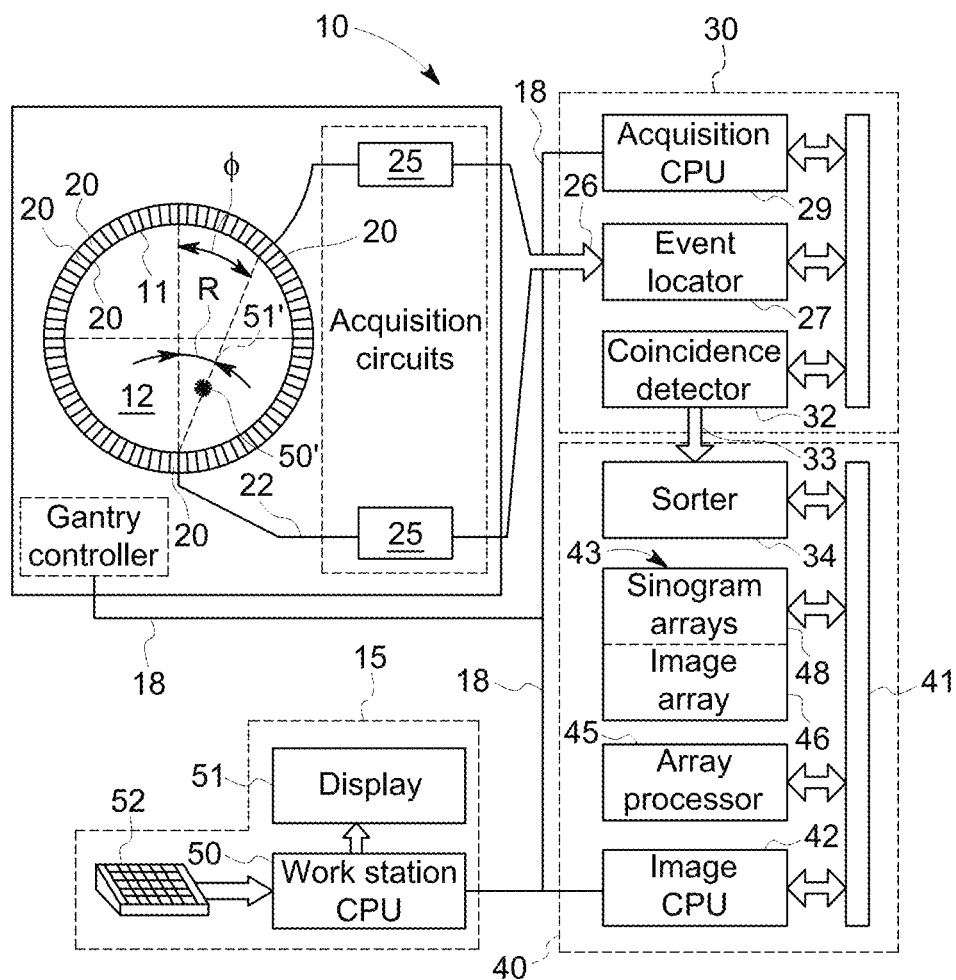
FIG. 11 is a schematic diagram of the imaging system of FIG. 10.
Figure 12:
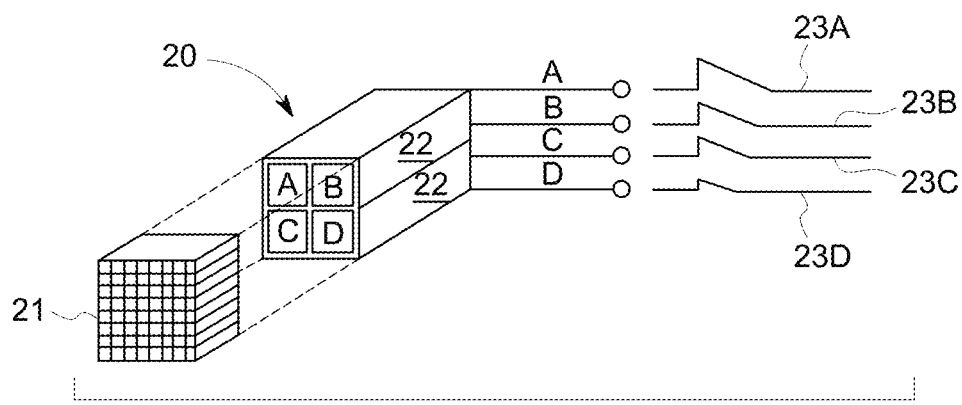
FIG. 12 illustrates an example of a detector module which forms part of the imaging system of FIG. 10 in accordance with various embodiments.

As discussed herein, various embodiments utilize a PET acquisition unit for acquiring PET information. FIGS. 10-12 illustrate a PET imaging system with which various embodiments described herein may be employed. FIG. 10 illustrates a PET scanning system 1 including a gantry 10 that supports a detector ring assembly 11 about a central opening or bore 12. The detector ring assembly 11 in the illustrated embodiments is generally circular and is made up of plural rings of detectors spaced along a central axis 2 to from a cylindrical detector ring assembly. A patient table 13 is positioned in front of the gantry 10 and is aligned with the central axis 2 of the detector ring assembly 11. A patient table controller (not shown) moves the table bed 14 into the bore 12 in response to commands received from an operator work station 15 through a communications link 16. A gantry controller 17 is mounted within the gantry 10 and is responsive to commands received from the operator work station 15 through a second communication link 18 to operate the gantry.

As shown in FIG. 10, the operator work station 15 includes a central processing unit (CPU) 50, a display 51, and a keyboard 52. An operator may use the keyboard to control the calibration of the PET scanner, the configuration of the PET scanner, and the positioning of the patient table for a scan. Also, the operator may control the display of the resulting image on the display 51 and/or perform image enhancement functions using programs executed by the work station CPU 50.

The detector ring assembly 11 includes a number of detector modules. For example, the detector ring assembly 11 may include 36 detector modules, with each detector module including eight detector blocks. An example of one detector block 20 is shown in FIG. 10. The detector blocks 20 in a detector module may be arranged, for example, in a 2×4 configuration such that the circumference of the detector ring assembly 11 is 72 blocks around, and the width of the detector assembly 11 is 4 detector blocks wide. Each detector block 20 may include a number of individual detector crystals. In the illustrated embodiment, the array of detector crystals 21 is situated in front of four photosensors 22. The photosensors 22 are depicted schematically as photomultiplier tubes; however, it may be noted that SiPM's may be employed in various embodiments. Other configurations, sized and numbers of detector crystals, photosensors and detector modules may be employed in various embodiments.

During a PET scan, an annihilation photon may impact one of the detector crystals 21. The detector crystal 21, which may be formed, for example of lutetium yttrium silicate (LYSO) or bismuth germinate (BGO), for example, converts the annihilation photon into a number of photons which are received and detected by the photosensors. The photons generated by a detector crystal generally spread out to a certain extent and travel into adjacent detector crystals such that each of the four photosensors 22 receives a certain number photons as a result of an annihilation photon impacting a single detector crystal 21.

In response to a scintillation event, each photosensor 22 produces a signal 23A-23D on one of the lines A-D, as shown in FIG. 12, which rises sharply when a scintillation event occurs and then tails off exponentially. The relative magnitudes of the signals are determined by the position in the detector crystal array at which the scintillation event took place. The energy of the annihilation photon which caused the scintillation event determines the total magnitude of the four signals. The time that the signal begins to rise is determined by when the scintillation event occurs and the time required for photons to travel from the position of the scintillation event to the photosensors. The example depicted in FIG. 12 provides an example based on a vacuum photodetector; however, it may be noted that certain principles disclosed herein may also be applied to SiPM detectors generally.

As shown in FIG. 11, a set of acquisition circuits 25 is mounted within the gantry 10 to receive the four signals from the detector block 20. The acquisition circuits 25 determine timing, energy and the event coordinates within the array of detector crystals using the relative signal strengths. The results are digitized and sent through a cable 26 to an event locator circuit 27 housed in a separate cabinet 28. Each acquisition circuit 25 also produces an event detection pulse which indicates the exact moment the scintillation event took place.

The event locator circuits 27 form part of a data acquisition processor 30 which periodically samples the signals produced by the acquisition circuits 25. The data acquisition processor 30 has an acquisition CPU 29 which controls communications on the local area network or communication link 18 and a bus 31. The event locator circuits 27 assemble the information regarding each valid event into a set of digital numbers that indicated when the event took place and the identity of the detector crystal 21 which detected the event. The event locator circuits 27, for example, may use a detector position map to map a pair of coordinates to the detector 21 which detected the event.

The event data packets are transmitted to a coincidence detector 32 which is also part of the data acquisition processor 30. The coincidence detector 32 accepts the event data packets from the event locator circuits 27 and determines if any two of them are in coincidence. Coincidence is determined by a number of factors. For example, time markers in each event data packet may be required to be within a specified time period of each other, e.g., 6 nanoseconds. As another example, the locations indicated by the two event data packets may be required to lie on a straight line which passes through the field of view (FOV) of in the scanner bore 12. Events which cannot be paired are discarded, but coincident event pairs are located and recorded as a coincidence data packet that is transmitted through a serial link 33 to a sorter 34. The format of the coincidence data packet may be, for example, a thirty-two bit data stream which includes, among other things, a pair of digital number that precisely identify the locations of the two detector crystals 21 that detected the event.

The sorter 34, which may include a CPU and which forms part of an image reconstruction processor 40, receives the coincidence data packets from the coincidence detector 32. The function of the sorter 34 is to receive the coincidence data packets and allocate sinogram memory for the storage of the coincidence data. The set of all projection rays that point in the same direction (θ) and pass through the scanner's field of view is a complete projection, or "view", which makes a set of sinogram. The distance (R) between a particular projection ray and the center of the field of view locates that projection ray within the view. As shown in FIG. 6, for example, an event 50' occurs along a projection ray 51' which is located in a view at the projection angle θ and the distance R. The sorter 34 counts all of the events that occur on this projection ray (R, θ) during the scan by sorting out the coincidence data packets that indicate an event at the detector crystals 21 lying on the projection ray. During an emission scan, the coincidence counts are organized in memory 43, for example as a set of two-dimensional array, one for each axial image, and each having as one of its dimensions the projection angle θ and the other dimension the distance R. This θ by R map of the measured events may be referred to as sinogram array 48. The sorter 34 may also organize the coincidence events into other data formats. In a projection plane format, for example, other variables may be used to define coincidence events which are detected by pairs of detector crystals 21 in non-adjacent detector rings.

Coincidence events occur at random and the sorter 34 determines the θ and R values from the two crystal addresses in each coincidence data packet and increments the count of the corresponding sonogram array element. At the completion of the emission scan, the sinogram array 48 stores the total number of annihilation events which occurred along each ray. The array processor 45 reconstructs an image from the data in the sinogram array 48. First, however, a number of corrections may be made to the acquired data to correct for measurement errors such as those caused by attenuation of annihilation photons by the patient, detector gain non-uniformities, random coincidences, and integrator dead time. Each row of the corrected sinogram array is then Fourier transformed by the array processor 45 and multiplied by a one-dimensional filter array. The filtered data is then invers Fourier transformed, and each array element is back projected to form the image array 46. The image CPU 42 may either store the image array data or output the data to the operator work station 15.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A method including:
    acquiring initial positron emission tomography (PET) imaging data;
    acquiring computed tomography (CT) imaging data; and
    training a deep learning model for PET image reconstruction using the initial PET imaging data and the CT imaging data, wherein training the deep learning model includes a first stage and a second stage, with the first stage using the initial PET imaging data and the CT imaging data as inputs and providing modified PET imaging data as an output, and with the second stage using the initial PET imaging data and the modified PET imaging data as inputs and providing further modified PET imaging data as an output.

2. The method of claim 1, wherein training the deep learning model includes utilizing at least one convolutional block, with the at least one convolutional block using the initial PET imaging data as an input.

3. The method of claim 2, wherein the at least one convolutional block includes plural convolutional layers.

4. The method of claim 1, further comprising converting the CT imaging data from a CT format to a PET format before using the CT imaging data to train the deep learning model.

5. The method of claim 4, wherein acquiring the CT imaging data comprises acquiring the CT imaging data using X-ray photons, and wherein converting the CT imaging data to the PET format comprises converting the CT imaging data to PET equivalent imaging data that represents how the CT imaging data would appear if the CT imaging data were acquiring using PET gamma photons.

6. A system including:
    a PET acquisition unit configured to acquire initial PET imaging data;
    a CT acquisition unit configured to acquire CT imaging data; and
    a processing unit configured to acquire the initial PET imaging data and the CT imaging data from the PET acquisition unit and CT acquisition unit, respectively, and to reconstruct an image using a deep learning model, with the initial PET imaging data and the CT imaging data used as inputs to the deep learning model, wherein the deep learning model uses a first stage and a second stage to reconstruct the image, with the first stage using the initial PET imaging data and the CT imaging data as inputs and providing modified PET imaging data as an output, and with the second stage using the initial PET imaging data and the modified PET imaging data as inputs and providing further modified PET imaging data as an output.

7. The system of claim 6, wherein the deep learning model utilizes at least one convolutional block, with the at least one convolutional block using the initial PET imaging data as an input.

8. The system of claim 7, wherein the at least one convolutional block includes plural convolutional layers.

9. The system of claim 8, wherein at least two convolutional layers have a common number of filters, and at least one convolutional layer has a different number of filters that is different from the common number.

10. The system of claim 6, wherein the processing unit is configured to convert the CT imaging data from a CT format to a PET format before using the CT imaging data as an input to the deep learning model.

11. The system of claim 10, wherein the CT acquisition unit is configured to acquire the CT imaging data using X-ray photons, and wherein the processing unit is configured to convert the CT imaging data to PET equivalent CT imaging data that represents how the CT imaging data would appear if the CT imaging data were acquiring using PET gamma photons.

12. A method including:
acquiring initial PET imaging data with a PET acquisition unit;
acquiring CT imaging data with a CT acquisition unit; and
reconstructing an image using a deep learning model, wherein the initial PET imaging data and the CT imaging data are used as inputs to the deep learning model, wherein the deep learning model uses a first stage and a second stage to reconstruct the image, with the first stage using the initial PET imaging data and the CT imaging data as inputs and providing modified PET imaging data as an output, and with the second stage using the initial PET imaging data and the modified PET imaging data as inputs and providing further modified PET imaging data as an output.

13. The method of claim 12, wherein the deep learning model utilizes at least one convolutional block, with the at least one convolutional block using the initial PET imaging data as an input.

14. The method of claim 13, wherein the at least one convolutional block includes plural convolutional layers.

15. The method of claim 14, wherein at least two convolutional layers have a common number of filters, and at least one convolutional layer has a different number of filters that is different from the common number.

16. The method of claim 12, further comprising converting the CT imaging data from a CT format to a PET format before using the CT imaging data as an input to the deep learning model.

17. The method of claim 12, further comprising acquiring the CT imaging data using X-ray photons, and converting the CT imaging data to PET equivalent CT imaging data that represents how the CT imaging data would appear if the CT imaging data were acquiring using PET gamma photons.

* * * * *